United States Patent [19]

Ellis et al.

[11] Patent Number: 5,392,318
[45] Date of Patent: Feb. 21, 1995

[54] METHOD AND APPARATUS FOR DESKEWING/RESYNCHRONIZING DATA SLICES WITH VARIABLE SKEWS

[75] Inventors: David Ellis, Hillsboro; Gary Brady, Portland; Andy Groves, Hillsboro, all of Oreg.

[73] Assignee: Intel Corporation, Santa Clara, Calif.

[21] Appl. No.: 40,902

[22] Filed: Mar. 31, 1993

[51] Int. Cl.$^6$ .............................................. H04L 7/00
[52] U.S. Cl. ......................................... 375/118; 371/1; 327/141; 327/292
[58] Field of Search ................... 375/118, 107; 371/1; 307/590; 328/55; 370/105.3

[56] References Cited

U.S. PATENT DOCUMENTS

| | | | |
|---|---|---|---|
| 4,429,386 | 1/1984 | Graden | 375/118 |
| 4,941,156 | 7/1990 | Stern et al. | 375/118 |
| 5,157,696 | 10/1992 | Hara | 375/1 |

*Primary Examiner*—Stephen Chin
*Assistant Examiner*—Tesfaldet Bocure
*Attorney, Agent, or Firm*—Blakely, Sokoloff, Taylor & Zafman

[57] ABSTRACT

Each data sending high speed circuit generating and sending a stream of data slices and a stream of clock pulses is provided with a sync pulse generation circuit for synchronously generating and sending an accompanying stream of periodic sync pulses. The various streams of data slices, clock pulses, and periodic sync pulses incur varying amount of delays as they travel from the data sending high speed circuits to a data acquisition circuit. The data acquisition high speed circuit is provided with a plurality of circular buffer chains of appropriate length for independently buffering the skewed data slices until all corresponding data slices have been received and buffered, and then concurrently reading the buffered corresponding data slices out of the circular buffer chains. The data acquisition high speed circuit is also provided with a plurality of corresponding independent write address generators and a common read address generator for generating the independent write buffer addressed and the synchronized read buffer addresses using the data clocks and the periodic sync pulses. As a result, the skewed data slices are deskewed or resynchronized as they are read out of the circular buffer chain.

35 Claims, 7 Drawing Sheets

METHOD AND APPARATUS FOR DESKEWING/RESYNCHRONIZING DATA SLICES WITH VARIABLE SKEWS

BACKGROUND OF THE INVENTION

1. Field of the Invention:

The present invention relates to the field of high speed digital circuits, in particular, high speed digital circuits based on CMOS technology. More specifically, the present invention relates to a method and apparatus for resynchronizing data slices with variable skews in a digital system, such as a data instrumentation system.

2. Background:

In a number of digital applications, such as data instrumentation, it is often necessary for a high speed circuit to resynchronize the data inputs it receives because of its sensitivity to data skews due to its high operating speed. These circuits include but not limited to those operating at a speed of 66 MHZ or higher. A particular example is when a stream of data is being decomposed and sent in the form of multiple interrelated streams of data slices from a number of remote high speed circuits to an acquisition high speed circuit. More specifically, when each stream of data slices is sent with its own clock to allow the data acquisition high speed circuit to capture the data from the interrelated streams of data slices. Since the different streams may encounter different analog delays in the system as they travel from the remote high speed circuits to the data acquisition high speed circuit, the data acquisition high speed circuit must be able to properly capture the data from corresponding data slices in the interrelated streams.

Thus, it is desirable to be able to resynchronize the data slices with variable skews. As will be disclosed, the present invention provides such a method and apparatus, which advantageously achieves the desirable results. As will be obvious from the descriptions to follow, the present invention has particular application to high speed data instrumentation systems.

SUMMARY OF THE INVENTION

Under the present invention, the desirable results are advantageously achieved by providing each of the remote data sending high speed circuits with a sync pulse generation circuit comprising a gray code counter for synchronously generating periodic sync pulses with a predetermined periodicity using a control value. The sync pulses are provided to the data acquisition high speed circuit in conjunction with the data slices and the data clocks.

Additionally, the data acquisition high speed circuit is provided with a plurality of circular buffer chains of appropriate length, one circular buffer chain for each data sending high speed circuit, for independently receiving and buffering the skewed data slices until at least their corresponding data slices have all been received and buffered. The length of each circular buffer chain is dependent on the maximum amount of skew that can be incurred between any two streams of data slices. The length of each circular buffer in turn determines the periodicity of the sync pulses.

Furthermore, the data acquisition high speed circuit is provided with a plurality of corresponding independent write buffer address generators, one write buffer address generator per circular buffer chain, and a common mad address generator, for receiving the data clocks and the periodic sync pulses, and generating the write and read buffer addresses using the data clocks and the periodic sync pulses. Write and read addresses for each circular buffer chain are generated in a cyclical manner. The timing of the write addresses for the various circular buffer chains are independent. However, the timing of the read addresses for the various circular buffer chains are synchronized by using the write addresses of one of the circular buffer chains and applying an appropriate amount of delay. As a result, corresponding data slices are read out of the circular buffer chains simultaneously, thereby deskewing or resynchronizing the data slices.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
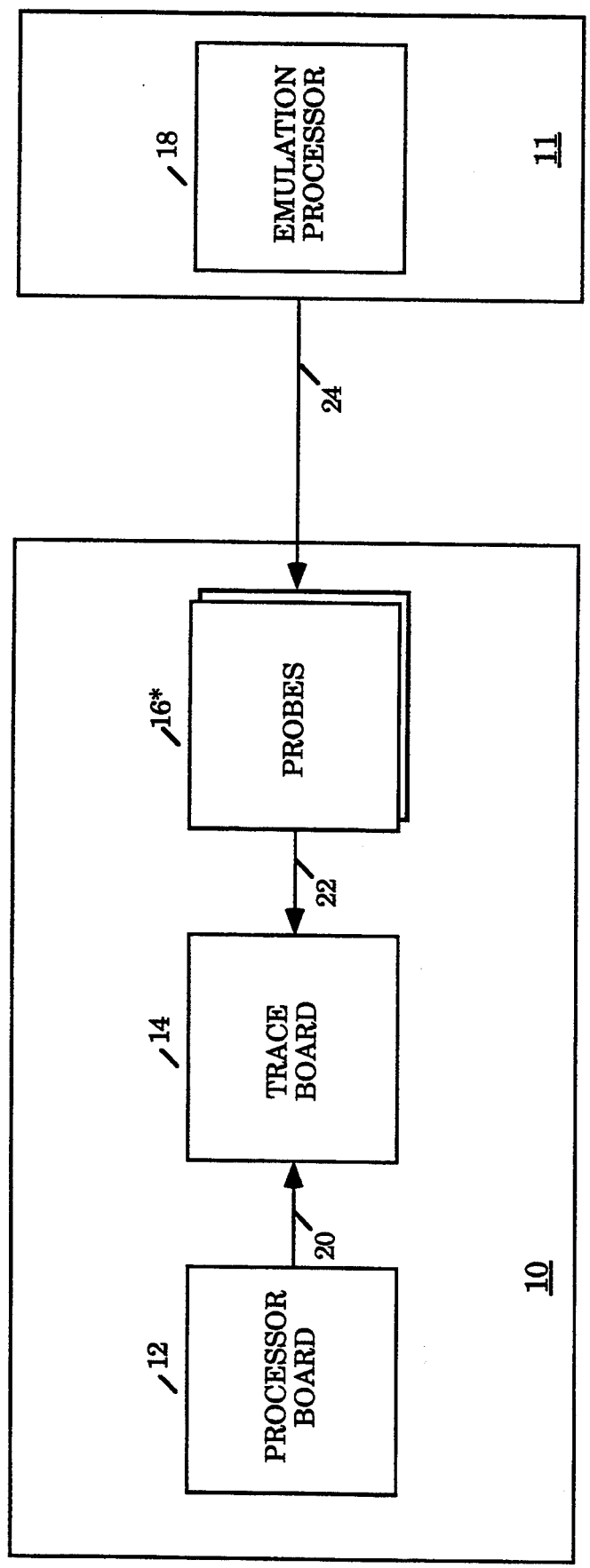
FIG. 1 illustrates an exemplary data instrumentation system incorporated with the teachings of the present invention.

Referring now to FIG. 1, a block diagram illustrating an exemplary high speed data instrumentation system incorporated with the teachings of the present invention is shown. Shown is an exemplary data instrumentation system 10 incorporated with the teachings of the present invention coupled to a target system 11 for monitoring, acquiring data, and controlling the target system 11. The exemplary data instrumentation system 10 comprises a processor board 12, a trace board 14, and a number of probes 16, while the target system 11 comprises an emulation processor. The processor board 12 is coupled to the trace board 14, for example, through a parallel bus 20. The trace board 14 is coupled to the probes 16, for example, through a number of parallel cables 22. The probes 16 are in turn coupled to the emulation processor 18. Data are decomposed and sent as multiple streams of data slices from the probes 16 to the trace board 14. Each stream of data slices is sent with its own clock to enable the data to be captured in the trace board 14. Additionally, the trace board 14 and the probes 16 are incorporated with the teachings of the present invention for resynchronizing the data slices before they are recombined in the trace board 14. The trace board 14 and the probes 16 will be described below in further detail with additional references to the remaining figures. The processor board 12 and the emulation processor 18 are intended to represent a broad category of these elements found in many general and special purpose computer systems. Their constitutions and functions are well known and will not be further described.

While the present invention is being described with a trace board and a number of probes, based on the description to follow, it will be appreciated that the present invention may be practiced with any interrelated data sending remote high speed digital circuits on the data instrumentation system. In fact, the present invention may be practiced with any digital systems comprising such interrelated data sending remote high speed digital circuits, including for example a microprocessor based computer system.

Figure 2:
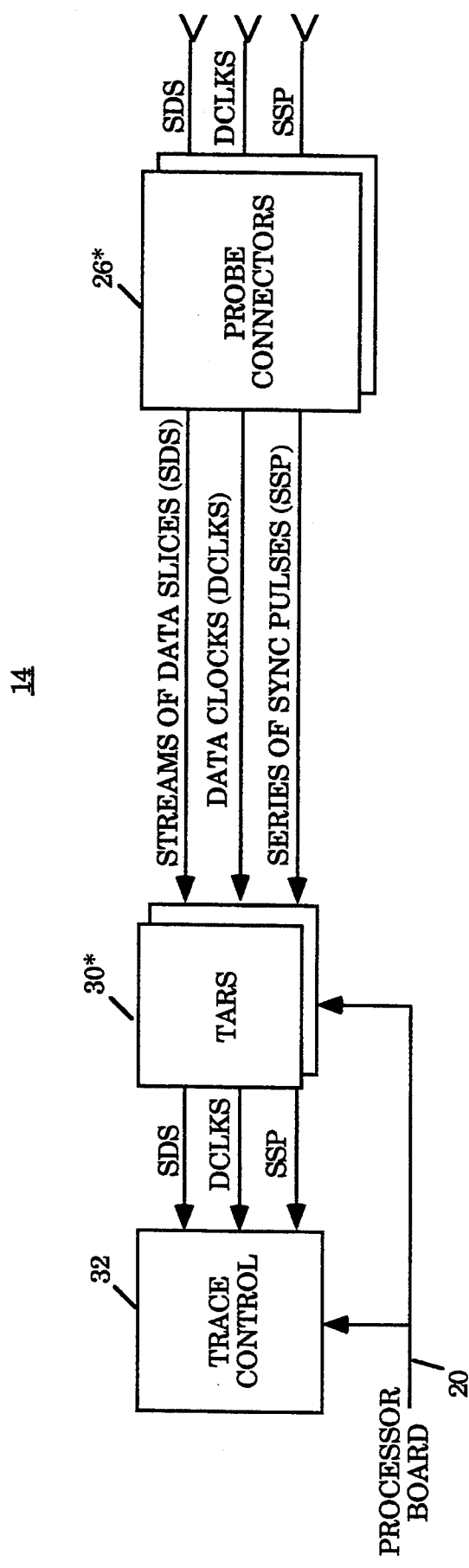
FIG. 2 illustrates the trace board of FIG. 1 in further detail.

Referring now to FIG. 2, a block diagram illustrating the trace board of FIG. 1 in further detail is shown. The trace board 14 comprises a plurality of high speed trace and recognition circuitry (TAR) 30*, a plurality of probe connectors 26*, and trace control circuitry 32. The high speed TARs 30* are coupled to the probe connectors 26* and the trace control circuitry 32. The TARs 30* and the trace control circuitry 32 are also coupled to the processor board through the parallel bus 20. The probes are connected to the trace board 14 through the probe connectors 26*. Each of the high speed TARs 30* receives a stream of data slices (SDS) along with its own digital clock (DCLKS) from a probe through one of the probe connectors 26*. Additionally, each TARs 30* is also provided with a stream of periodic sync pulses (SSP) by the probes through one of the probe connectors 26*. The various streams of data slices along with their data clocks and sync pulses are in turn provided to the trace control circuitry 32 for recombination, incurring varying amount of delays as they travel through the connecting cables, the probe connectors 26*, and the TARs 30*. The trace board 14 and the probes are incorporated with the teachings of the present invention for synchronously generating the sync pulses, whereas the trace control circuitry 32 is incorporated with the teachings of the present invention for deskewing/resynchronizing the data slices using the sync pulses provided. Otherwise, the trace board 14 including the trace control circuitry 32, the TARs 30*, and the probe connectors 26*, are intended to represent a broad category of trace boards and the elements found therein on data instrumentation systems. Their basic constitutions and functions are well known, and will not be described further.

Figure 3:
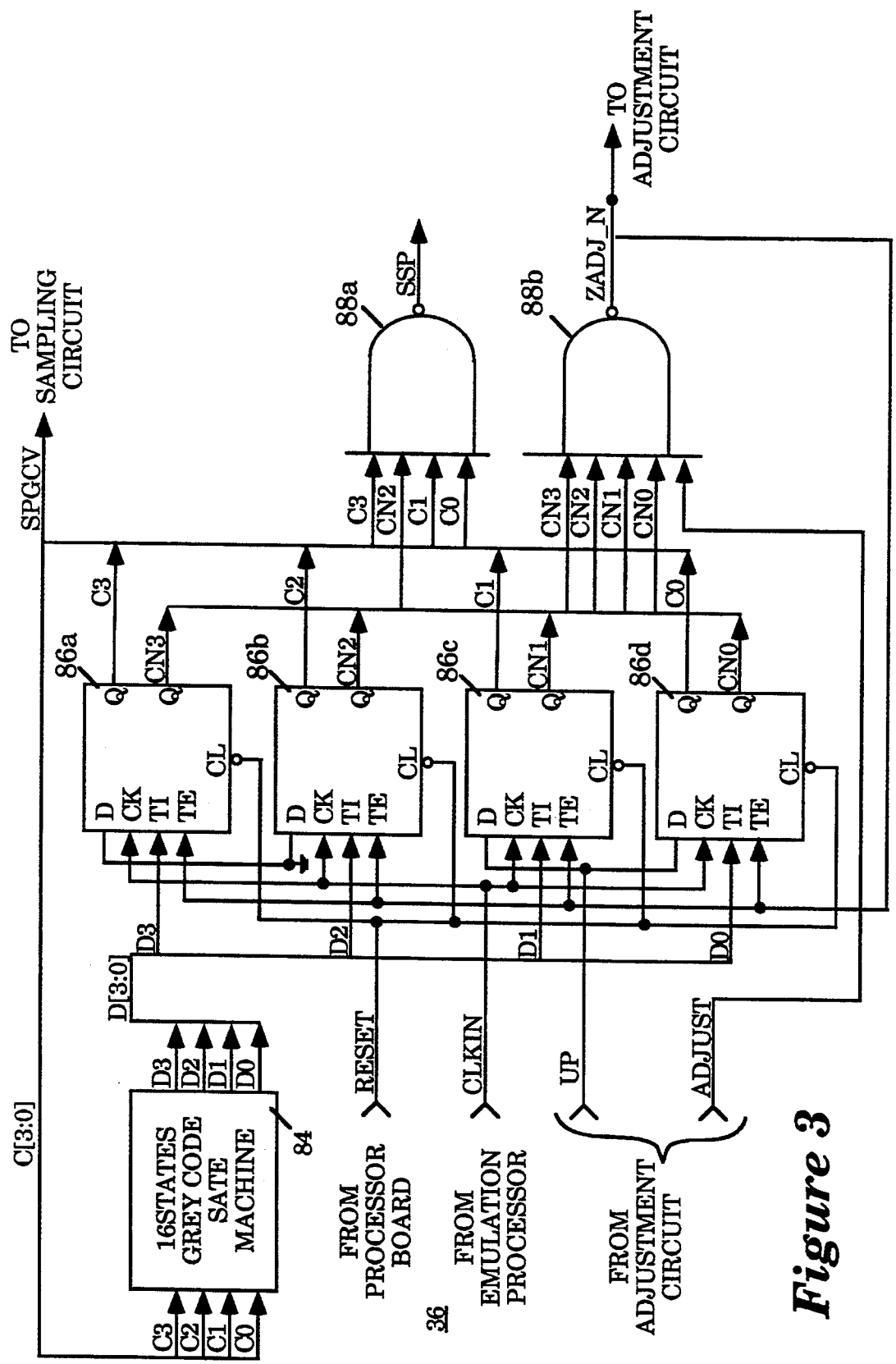
FIG. 3 illustrates one embodiment of the sync pulse generation circuit of the present invention provided to each probe of FIG. 1.

Referring now to FIG. 3, a diagram illustrating one embodiment of the sync pulse generation circuit of the present invention provided to each of the probes in FIG. 1 is shown. Each sync pulse generation circuit 36 is used to generate a stream of periodic sync pulses with a predetermined periodicity using a control value. In this embodiment, the sync pulse generation circuit 36 comprises a 16 states gray code state machine 84, four flip-flops 86a–86d with selectable dual inputs, and two multiple input NAND gates 88a–88b, serially coupled to each other. The 16 states gray code state machine 84 is used to generate 16 gray code state values, one at a time, in a cyclical manner. In other words, the state machine 84 outputs {0000}, {0001}, {0011}, ... {1011}, {1001}, and {1000} in a cyclical manner. Each gray code state value output by the state machine 84 is clocked into the four flip-flops 86a–86d, one bit per flip-flop, through the TI inputs (TI is selected during normal operation), using a buffered input clock (CLKIN) provided to the particular probe by the emulation processor. Concurrently, each gray code state value and its complement are clocked out of the Q and Q' outputs of the flip-flops 86a–86b. Selected bits of each clocked out gray code state value and its complement are then provided to the first NAND gate 88a to conditionally generate a sync pulse. Each clocked out gray code state value is also provided back to the state machine 84 to cause it to generate the next gray code state value. As the process repeats itself, a sync pulse is generated once every 16 clock periods for the particular probe.

While the present invention is being described with sync pulse generation circuits having 16 states gray code state machines for generating sync pulse series having the same periodicity of one sync pulse every 16 clock periods, it will be appreciated that the present invention may be practiced with sync pulse generation circuits that generate sync pulse series with other periodicities.

The generation of sync pulses by the sync pulse generation circuits 36 of various probes are synchronized by synchronizing the control values in the flip-flops 86a–86d. The control values may be synchronized in a variety of manners including but not limited to the method and apparatus described in copending U.S. application Ser. No: 08/040,901, entitled Method and Apparatus For Synchronizing Periodic Sync Pulse Generations By A Number of Remote High Speed Circuits, assigned to the assignee of the present invention, and fully incorporated by reference herein. Under the method and apparatus described in the copending application, the control values are synchronized by repeatedly adjusting them through the D inputs of the flip-flops 86a–86d. The TI and D inputs are selected based on the TE inputs (ZADJ_N) of the flip-flops 86a–86d, which are provided by the second NAND gate 88b. The D inputs of the last two flip-flops 86c–86d are provided with an UP adjustment signal, whereas the D inputs of the first two flip-flops 86a–86b are grounded. The second NAND gate 88b is provided with an ADJUST adjustment signal, which is used in conjunction with the complement of the gray code state values (CN0–CN3) to generate the TE inputs (ZADJ_N) of the flip-flops 86a–86d.

Thus, when the control value in the flip-flops 86a–86d is a nonzero gray code state, regardless of the value of ADJUST, ZADJ_N equals 1, selecting the TI inputs of the flip-flops 86a–86d. Similarly, when the control value in the flip-flops 86a–86d is the zero gray code state, and ADJUST equals 0, ZADJ—N still equals 1, selecting the TI inputs of the flip-flops 86a–86d. On the other hand, when the control value in the flip-flops 86a–86d is the zero gray code state, and ADJUST equals 1, ZADJ_N equals 0, selecting the D inputs of the flip-flops 86a–86d. Therefore, if UP equals 1 whenever the D inputs of the flip-flops 86a–86d are selected, the control value in the flip-flops 86a–86d is advanced by 2 gray code states instead of 1 gray code state. On the other hand, if UP equals 0 whenever the D inputs of the flip-flops 86a–86d are selected, the control value in the flip-flops 86a–86d is held at the same gray code state for a successive clock pulse. After this clock pulse, the UP and ADJUST signals are removed. As a result, adjustments to the control values in the flip-flops 86a–86d of the sync pulse generation circuits 36 of the various probes are effectuated.

The UP and ADJUST adjustment control signals are provided and removed by an adjustment circuit (not shown) of the probe, which generates and removes the UP and ADJUST adjustment control signals based on a number of sync pulse generation control value adjustment controls (SPGCVAC) it receives from the processor board through the trace board, and the ZADJ_N signal it receives as feedback from the sync pulse generation circuit 36 of the particular probe. The processor board provides the sync pulse generation control value adjustment controls (SPGCVAC) based on the consistent sample results stored in a sampling circuit (not shown) of the particular probe. Whether the sample results are consistent is determined by a comparison circuit (not shown) of the particular probe. The sampling circuit samples the control values in the flip-flops 86a–86d, and the comparison circuit compares the sampled control values, under the control of coordination pulses provided by a coordination pulse generator (not shown) provided in the trace board. The coordination pulse generator generates the coordination pulses using a reference clock and delay selection controls it received as inputs. For further description of the sampling, comparison, and adjustment circuits provided to each probe, and the coordination pulse generator provided to the trace board, see the copending application Ser. No. 08/040,901, identified above.

Figure 4:
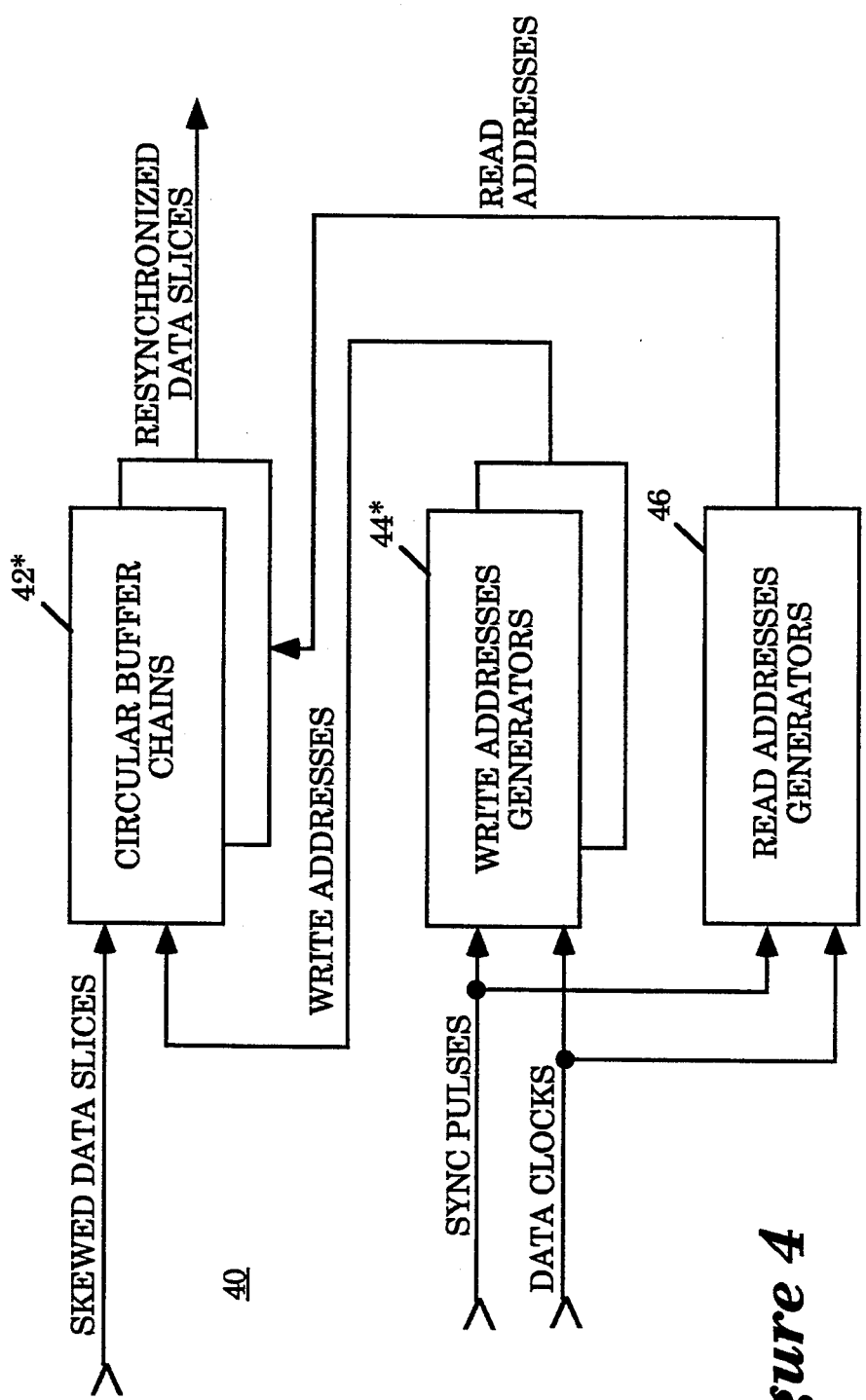
FIG. 4 illustrates the circular buffer chains, the write address generators, and the read address generator of the present invention provided to the trace control circuitry of FIG. 2.
Figure 5:
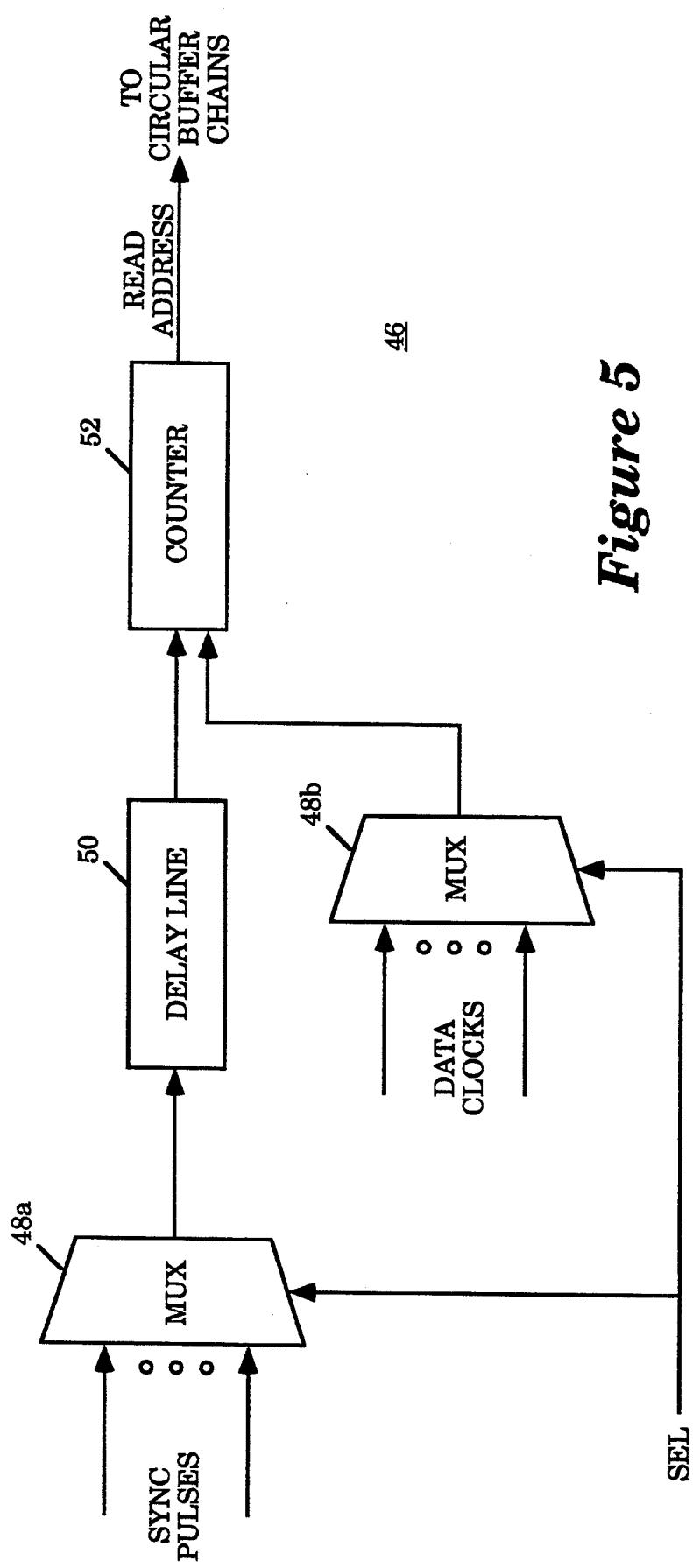
FIG. 5 illustrates one embodiment of the common address generator of FIG. 4 in further detail.

Referring now to FIGS. 4 and 5, two block diagrams illustrating the circular buffer chains, the corresponding write address generators, and the common read address generator of the present invention provided to the trace control circuitry of FIG. 2 is shown. As illustrated in FIG. 4, the trace control circuitry is provided with a number of circular buffer chains 42* of appropriate lengths, one for each probe, a number of corresponding write address generators 44*, one for each circular buffer chain 42*, and a common read address generator 46. Together, these elements 42*, 44*, and 46 cooperate to deskew or resynchronize the data slices in the various streams.

The circular buffer chains 42* cooperate with the write and read address generators 44* and 46 by receiving and buffering the skewed data slices of the various streams until all corresponding data slices have been received, buffered, and read. For ease of implementation and improved flexibility, each circular buffer chain 42* is provided with the same length, i.e. the same number of storage locations. Furthermore, the length is sufficiently long to allow (1) any one of the circular buffer chains 42* to concurrently buffer all data slices of the fastest stream waiting for their corresponding data slices in the slower streams to arrive and be read out concurrently as soon as all corresponding data slices have been buffered, and (2) the write addresses of any one of the circular buffer chains 42* be used as reference write addresses and having a constant predetermined set back applied to them to generate the read addresses. That length is twice the length necessary to accommodate the sum of the maximum skew between any two streams of data slices and the set up and propagation time required to concurrently read the corresponding data slices out of the circular buffer chains 42* as soon as they have all been buffered. The circular buffer chains 42* may be implemented with a variety of well known elements including but not limited to flip-flops.

The write address generator 44* cooperate with the circular buffer chains 42* and the common read address generator 46 by generating independent write addresses for the circular buffer chains 42* for the arriving skewed data slices. The write address generator 44* receive the various series of periodic sync pulses and corresponding data clocks, and generate write addresses for the various circular buffer chains 42* systematically in a cyclical manner, using the received sync pulses and data clocks. Since the various series of periodic sync pulses and data clocks incur varying amount of delays, the timing of the write addresses generated for the various circular buffer chains 42* are independent. Since the circular buffer chains 42* are sufficiently long to accommodate the sum of the maximum skew between any two streams and the set up and propagation time required to concurrently read the corresponding data slices out of the circular buffer chains 42* as soon as they all have been buffered, the write addresses generated will never cause the waiting data slices to be over written before they are read. The write address generators 44* may also be implemented with a variety of well known elements including but not limited to flip-flop based counters.

The common read address generator 46 cooperates with the circular buffer chains 42* and the write address generators 44* by generating synchronized read addresses for the circular buffer chains 42* for concurrently reading corresponding data slices out of the circular buffer chains 42* as soon as they have all been received and buffered in the circular buffer chains 42*. The common read address generator 46 also generates the read addresses in a cyclical manner, however the generated read addresses "trail" the generated write addresses. As described earlier, the common read address generator 46 generates the synchronized read addresses by applying a constant predetermined set back to a reference series of write addresses, which are the generated write addresses of one of the arbitrarily selected circular buffer chain 42*. For the embodiment where the chain lengths of the circular buffer chains 42* all equal twice the sum of the maximum skew and the set up and propagation time required to read the corresponding data slices as soon as they all have been buffered, the constant predetermined set back is one-half ($\frac{1}{2}$) the common chain length, regardless which circular buffer chain's write addresses are selected as the reference write addresses.

FIG. 5 illustrates one embodiment of the common read address generator of FIG. 4 in further detail. In this embodiment, the common read address generator 46 comprises a number of selectors 48a and 48b, a delay pipe 50, and a counter assembly 52 coupled to each other in the manner illustrated. The selectors 48a and 48b select one series of the periodic sync pulses and its corresponding data clock as the reference series of periodic sync pulses and data clock. The selected data clock is used to increment a counter in the counter assembly 52, and the selected series of periodic sync pulses is used to clear and restart the counter after it has been properly delayed in the delay pipe 50 to effectuate the application of the constant predetermined set back. Since the selected series of periodic sync pulses and the corresponding data clock are used to generate the write addresses for one of the circular buffer chain 42*, the read addresses output by the counter assembly 52 are effectively the reference write addresses having the constant predetermined set back, i.e. ½ of common buffer chain length. applied to them.

While the present invention has been described with circular buffer chains 42* having equal chain lengths, it will be appreciated that the present invention many be practiced with different circular buffer chain lengths, provided they are "sufficiently long" for their corresponding streams, and their corresponding write address generators 44* as well as the common read address generator 46 are all adjusted accordingly. Additionally, while the present invention has been described with the corresponding data slices being concurrently read out of the circular buffer chains 42* as soon as they all have been buffered, it will also be appreciated that the present invention may be practiced with the corresponding data slices being concurrently read out of the circular buffer chains 42* at a later time, provided the circular buffer chain lengths 42* are adjusted accordingly. Furthermore, while the present invention has been described with the read addresses being generated by applying a set back equaling ½ of the common buffer chain length to the arbitrarily selected reference series of write addresses, it will be appreciated that the present invention may be practiced with other manners of selecting reference write addresses, and having different amount of set back applied to them. In particular, if it is known that the write addresses of the circular buffer chain 42* for the slowest stream is going to be used as the reference write addresses, the constant set back may be one storage location instead of ½ of the common buffer chain length.

Figure 6A:
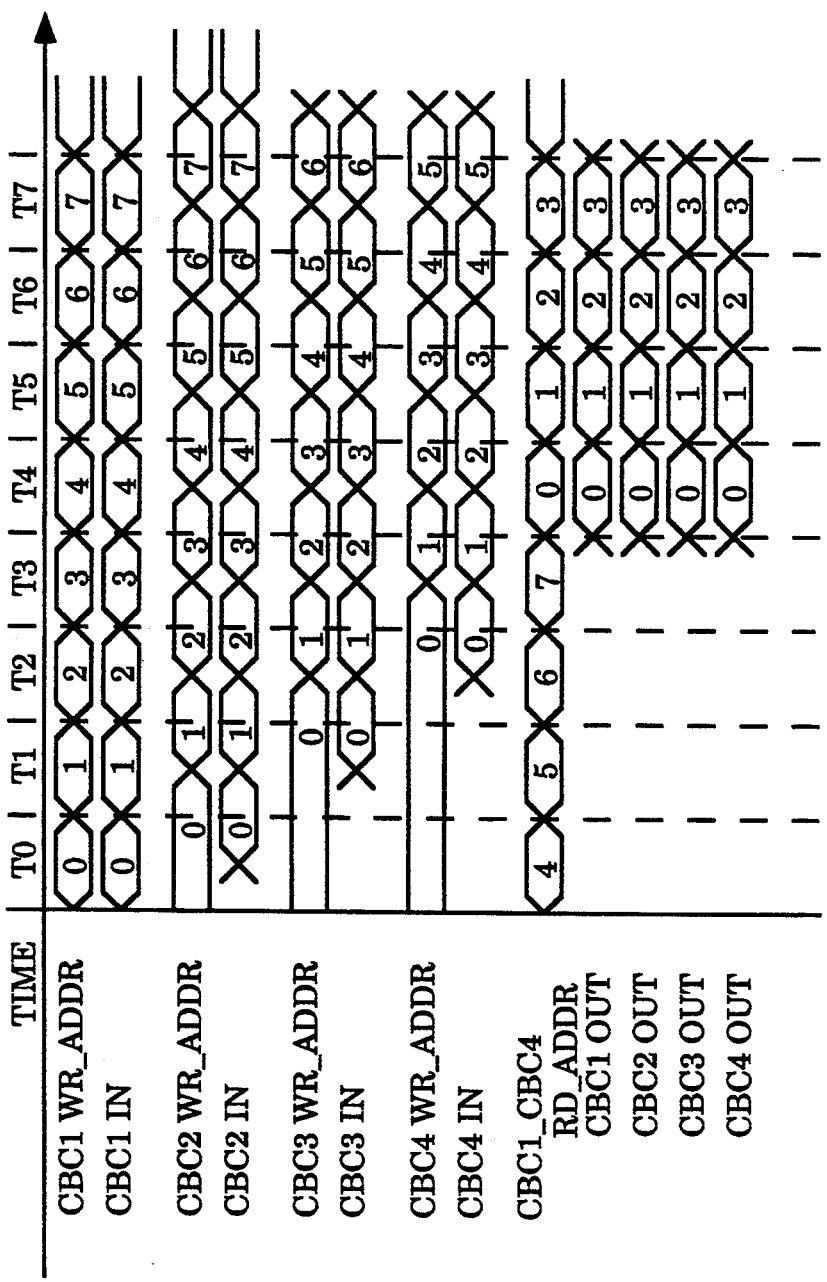
FIGS. 6a–6b illustrates deskewing/resynchronizing of a number of exemplary streams of data slices.
Figure 6B:
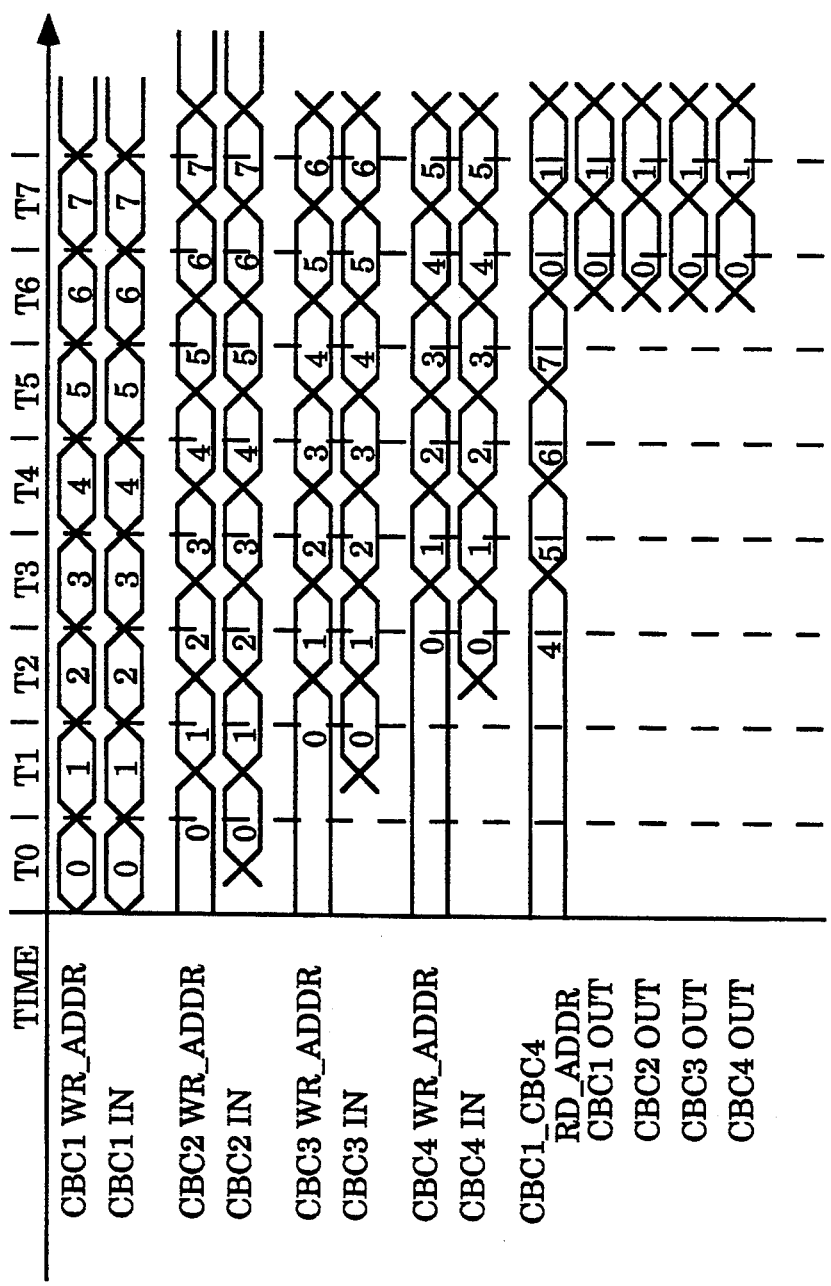

Referring now to FIGS. 6a-6b, two timing diagrams illustrating the deskewing or resynchronizing of four exemplary data streams are shown. FIG. 6a illustrates deskewing or resynchronizing the four exemplary data streams using the write addresses of the first circular buffer chain (CBC1) as reference write addresses to generate the synchronized read addresses, whereas FIG. 6b illustrates deskewing or resynchronizing the four exemplary data streams using the write addresses of the fourth circular buffer chain (CBC4) as reference write addresses to generate the synchronized read addresses. For the purpose of these illustrations, it is assumed that there are four circular buffer chains (CBC1 through CBC4), one for each of the four exemplary data streams, and all four circular buffer chains have a chain length of eight (8) storage locations. Additionally, for ease of explanation, the set up and propagation time required to concurrently read the corresponding data slices out of the circular buffer chains as soon as they have all been buffered are assumed to be insignificant.

As illustrated by CBC1 IN through CBC4 IN in FIGS. 6a and 6b, the four exemplary data streams have a maximum skew of two and a half (2½) clock periods. More specially, the slower streams (CBC2 IN through CBC4 IN) are skewed ½, 1½, and 2½ clock periods behind the fastest stream (CBC1). As illustrated by CBC1 WR_ADDR through CBC4 WR_ADDR in FIGS. 6a and 6b, the write addresses for the four circular buffer chains are generated independent using the four exemplary data streams' corresponding periodic sync pulses and data clocks. As a result, corresponding data slices are stored into the storage locations of the four circular buffer chains at the time shown. For examples, corresponding data slice zeroes are stored into storage location zeroes of the four circular buffer chains at time t0, between t0 and t1, between t1 and t2, and between t2 and t3 respectively, and corresponding data slice ones are stored into storage location ones of the four circular buffer chains at time t1, between t1 and t2, between t2 and t3, and between t3 and t4 respectively.

As illustrated by CBC1-CBC4 RD_ADDR in FIGS. 6a and 6b, the read addresses are synchronized and generated using the write addresses of one of the circular buffer chain as reference write addresses and applying a constant set back of ½ of the chain length (4 storage locations in these illustrations) to them. As described earlier, the reference write addresses in FIG. 6a are CBC1 WR_ADDR, whereas the reference write addresses in FIG. 6b are CBC4 WR_ADDR. More specifically, the read addresses at time t0-t7 are 4 through 7 and then 0 through 3 in FIG. 6a, whereas, the read addresses at time t0 through midway of t3 remain at 4, and from midway of t3 through midway of t7 are 5 through 7 and then 0. As a result, the four exemplary data streams are deskewed or resynchronized with the corresponding data slices concurrently read out of the four circular buffer chains at the time periods illustrated by CBC1 OUT through CBC4 OUT, i.e. t4, t5, t6, t7 etc. in FIG. 6a, between t6/t7 etc. in FIG. 6b.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a digital system comprising
    a plurality of data sending high speed circuits, and
    a data receiving high speed circuit,
    wherein each of said data sending high speed circuits concurrently generates and sends a stream of data slices and a companion stream of clock pulses to said data receiving high speed circuit, and
        said streams of data slices and clock pulses incur varying amount of delays when they travel from said data sending high speed circuits to said data receiving high speed circuit,
    an apparatus for deskewing/resynchronizing said streams of data slices, said apparatus comprising:
    a) buffer means coupled to said data sending high speed circuits for receiving said streams of data slices, and individually buffering said received streams of data slices for at most a time period t, where t is a function of the maximum amount of skew between any two of said streams of data slices;
    b) sync pulse generation means for synchronously generating a plurality of streams of periodic sync pulses corresponding to said streams of data slices and clock pulses, each stream of periodic sync pulses having a predetermined periodicity p, said streams of periodic sync pulses incurring similar amount of delays as their corresponding streams of data slices and clock pulses when they travel to said data receiving high speed circuit;
    c) write buffer address generation means coupled to said data sending high speed circuits, said buffer means and said sync pulse generation means, for receiving said streams of clock pulses and periodic sync pulses, and independently generating write buffer addresses for said buffer means using said received clock pulses and periodic sync pulses; and d) read buffer address generation means coupled to said data sending high speed circuits, said sync pulse generation means, and said buffer means for receiving one of said streams of clock pulses and its corresponding periodic sync pulses, and generating synchronized read buffer addresses for said buffer means using said received stream of clock pulses and periodic sync pulses.

2. The apparatus as set forth in claim 1, wherein, said buffer means comprises a plurality of circular buffer chains coupled to said data sending high speed circuits, said write buffer address generation means and said read buffer address generation means, for receiving and buffering said streams of data slices, each of said circular buffer chains having sufficient capacity for buffering one of said received streams of data slices for at most said time period t.

3. The apparatus as set forth in claim 2, wherein,
each set of said corresponding data slices is read as soon as its data slices have been buffered in said circular buffer chains;
said time period t equals the sum of the maximum skew between any two streams of data slices and the amount of set up and propagation time required to concurrently read a set of corresponding data slices from said circular buffer chains.

4. The apparatus as set forth in claim 3, wherein, each of said circular buffer chains has a capacity that is twice the capacity for buffering one of said received streams of data slices for at most said time period t.

5. The apparatus as set forth in claim 1, wherein, said sync pulse generation means comprises a plurality of sync pulse generation circuits coupled to said write buffer address generation means and said read buffer address generation means for synchronously generating said streams of periodic sync pulses with said predetermined periodicity p.

6. The apparatus as set forth in claim 5, wherein, each of said sync pulse generation circuits comprises a multi-state state machine and a set of flip-flops coupled to said multi-state state machine for synchronously generating one stream of periodic sync pulses with said predetermined periodicity p using a control value.

7. The apparatus as set forth in claim 1, wherein, said write buffer address generation means comprises a plurality of write buffer address generators coupled to said data sending high speed circuits, said buffer means, and said sync pulse generation means for receiving said streams of clock pulses and periodic sync pulses, and independently generating said write buffer addresses using said received streams of clock pulses and periodic sync pulses.

8. The apparatus as set forth in claim 1, wherein, said read buffer address generation means comprises:
a delay pipe coupled said sync pulse generation means for receiving one of said streams of periodic sync pulses, applying a constant delay to said received stream of periodic sync pulses, said constant delay being logically equivalent to a constant storage location set back; and
a read buffer address generator coupled to said data sending high speed circuits, said buffer means and said delay pipe, for receiving said corresponding stream of clock pulses of said received stream of periodic sync pulses and said delayed stream of periodic sync pulses, and generating said synchronized read buffer addresses using said received streams of clock pulses and delayed periodic sync pulses.

9. The apparatus as set forth in claim 8, wherein,
said buffer means comprises a plurality of circular buffer chains coupled to said data sending high speed circuits, said write buffer address generation means and said read buffer address generation means, for receiving and buffering said streams of data slices, each of said circular buffer chains having sufficient capacity for buffering one of said received streams of data slices for at most said time period t; and
said constant storage location set back equals one-half of said circular buffer chains' individual capacity.

10. The apparatus as set forth in claim 8, wherein,
said received streams of data slices and periodic sync pulses are the streams incurring the most delays; and
said constant storage location set back equals one storage location.

11. The apparatus as set forth in claim 8, wherein,
said read buffer address generation means receives all of said streams of clock pulses and their corresponding streams of periodic sync pulses, instead of only one of said streams clock pulses and its corresponding stream of periodic sync pulses;
said read buffer address generation means further comprises at least one selector coupled to said data sending high speed circuits and said sync pulse generation means for receiving said streams of clock pulses and their corresponding periodic sync pulses, and selecting one of said streams of clock pulses and its corresponding stream of periodic sync pulses, said delay pipe and said read buffer address generator being coupled to said data sending high speed circuits through said at least one selector.

12. The apparatus as set forth in claim 1, wherein,
said sync pulse generation means are disposed on said data sending high speed circuit; and
said buffer means, said write buffer address generation means and said read buffer address generation means, are disposed on said data receiving high speed circuit.

13. In a digital system comprising
a plurality of data sending high speed circuits, and
a data receiving high speed circuit, w
herein each of said data sending high speed circuits concurrently generates and sends a stream of data slices and a common stream of clock pulses to said data receiving high speed circuit, and
said streams of data slices and clock pulses incur varying amount of delays when they travel from said data sending high speed circuits to said data receiving high speed circuit,
a method for deskewing/resynchronizing said streams of data slices, said method comprising the steps of:
a) receiving said streams of data slices, and individually buffering said received streams of data slices for at most a first time period t, where t is a function of the maximum amount of skew between any two of said streams of data slices;

b) synchronously generating a plurality of streams of periodic sync pulses corresponding to said streams of data slices and clock pulses, each stream having a predetermined periodicity p, said streams of periodic sync pulses incurring similar amount of delays as their corresponding streams of data slices and clock pulses when they travel to said data receiving high speed circuit;

c) receiving said streams of clock pulses and periodic sync pulses, and independently generating write buffer addresses for said buffer means using said received clock pulses and sync pulses; and d) receiving one of said streams of clock pulses and its corresponding periodic sync pulses, and generating synchronized read buffer addresses for said buffer means using said received streams of clock pulses and periodic sync pulses.

14. The method as set forth in claim 13, wherein, said step a) comprises receiving and buffering said streams of data slices in a plurality of circular buffer chains, each of said circular buffer chains having sufficient capacity for buffering one of said received streams of data slices for at most said time period t.

15. The method as set forth in claim 14, wherein,
each set of corresponding slices is read as soon as its data slices have been buffered in said circular buffer chains;
said time period t equals the sum of the maximum skew between any two streams of data slices and the amount of set up and propagation time required to concurrently read a set of corresponding data slices from said circular buffer chains.

16. The method as set forth in claim 15, wherein, each of said circular buffer chains has a capacity that is twice the capacity for buffering one of said received streams of data slices for at most said time period t.

17. The method as set forth in claim 13, wherein, said step b) comprises synchronously generating said streams of periodic sync pulses with said predetermined periodicity p using a plurality sync pulse generation circuits.

18. The method as set forth in claim 17, wherein, each of said sync pulse generation circuits comprises a multistate state machine and a set of flip-flops coupled to said multi-state state machine for synchronously generating one of said streams of periodic sync pulses with said predetermined periodicity p using a control value.

19. The method as set forth in claim 13, wherein, said step c) comprises receiving said streams of clock pulses and periodic sync pulses, and independently generating said write buffer addresses using said received streams of clock pulses and periodic sync pulses by a plurality of write buffer address generators.

20. The method as set forth in claim 13, wherein, said step d) comprises:

d.1) receiving one of said streams of periodic sync pulses, applying a constant delay to said received stream of periodic sync pulses, said constant delay being logically equivalent to a constant storage location set back; and d.2) receiving said received stream of periodic sync pulses' corresponding stream of clock pulses and said delayed stream of periodic sync pulses, and generating said synchronized read buffer addresses using said received stream of clock pulses and delayed periodic sync pulses by a read buffer address generator.

21. The method as set forth in claim 20, wherein,
said step a) comprises receiving and buffering said streams of data slices in a plurality of circular buffer chains, each of said circular buffer chains having sufficient capacity for buffering one of said received streams of data slices for at most said time period t, each set of said corresponding data slices being read as soon as its data slices have been buffered in said circular buffer chains; and
said constant storage location set back equals one-half of said circular buffer chains' individual capacity.

22. The method as set forth in claim 20, wherein,
said received streams of data slice and periodic sync pulses are the streams incurring the most delays; and
said constant storage location set back equals one storage location.

23. The method as set forth in claim 20, wherein,
said step d.1) comprises receiving all of said streams of clock pulses and their corresponding streams of periodic sync pulses, instead of one of said streams of clock pulses and its corresponding stream of periodic sync pulses, and
said step d.1) further comprises selecting one of said received streams of clock pulses and its corresponding stream of periodic sync pulses, said selected stream periodic sync pulses being applied said constant delay.

24. The method as set forth in claim 13, wherein,
said sync pulse generation means are disposed on said data sending high speed circuit; and
said buffer means, said write buffer address generation means, and said read buffer address generation means are disposed on said data receiving high speed circuit.

25. In a digital system comprising
a plurality of data sending high speed circuits, and
a data receiving high speed circuit,
wherein each of said data sending high speed circuits concurrently generates and sends a stream of data slices and a companion stream of clock pulses to said data receiving high speed circuit, and
said streams of data slices and clock pulses incur varying amount of delays when they travel from said data sending high speed circuits to said data receiving high speed circuit,
an apparatus for deskewing/resynchronizing said streams of data slices, said apparatus comprising:

a) a plurality of circular buffer chains of sufficient capacity coupled to said data sending high speed circuits for individually receiving and buffering one of said streams of data slices for at most a time period t, where t is a function of the maximum amount of skew between any two of said streams of data slices;

b) a plurality of sync pulse generation circuits for synchronously generating a plurality of streams of periodic sync pulses corresponding to said streams of data slices and clock pulses, each of said streams of periodic sync pulses having a predetermined periodicity p, said streams of periodic sync pulses incurring similar amount of delays as their corresponding streams of data slices and clock pulses when they travel to said data receiving high speed circuit;

c) a plurality of write buffer address generators coupled to said data sending high speed circuits, said plurality of circular buffer chains and said sync pulse generation circuits, for receiving said streams of clock pulses and periodic sync pulses, and independently generating write buffer addresses for said circular buffer chains using said received clock pulses and sync pulses; and d) read buffer address generators coupled to said data sending high speed circuits, said sync pulse generation circuits and said circular buffer chains, for receiving one of said streams of clock pulses and its corresponding periodic sync pulses, and generating synchronized read buffer addresses for said circular buffer chains using said received streams of clock pulses and periodic sync pulses.

26. The apparatus as set forth in claim 25, wherein, each set of said corresponding data slices is read as soon as its data slices have been buffered in said circular buffer chains; and said time period t equals the sum of the maximum skew between any two streams of data slices and the amount of set up and propagation time required to concurrently read a set of corresponding data slices from said circular buffer chains, each set of corresponding slices being read as soon as its data slices have been buffered in said circular buffer chains.

27. The apparatus as set forth in claim 25, wherein, each of said circular buffer chains has a capacity that is twice the capacity for buffering one of said received streams of data slices for said first time period t.

28. The apparatus as set forth in claim 25, wherein, each of said sync pulse generation circuits comprises a multi-state state machine and a set of flip-flops coupled to said multi-state state machine for synchronously generating one stream of periodic sync pulses with said predetermined periodicity p using a control value.

29. The apparatus as set forth in claim 25, wherein, said read buffer address generator comprises:

a delay pipe coupled said sync pulse generation circuits for receiving one of said streams of periodic sync pulses, applying a constant delay to said received stream of periodic sync pulses, said constant delay being logically equivalent to a constant storage location set back; and a read buffer address generator coupled to said data sending high speed circuits, said buffer means and said delay pipe, for receiving said corresponding stream of clock pulses of said received stream of periodic sync pulses and said delayed stream of periodic sync pulses, and generating said synchronized read buffer addresses using said received streams of clock pulses and delayed periodic sync pulses.

30. The apparatus as set forth in claim 29, wherein, said constant storage location set back equals one-half of said circular buffer chains' individual capacity.

31. The apparatus as set forth in claim 29, wherein, said received streams of data slice and periodic sync pulses are the streams incurring the most delays; and said constant storage location set back equals one storage location.

32. The apparatus as set forth in claim 25, wherein, said read buffer address generator receives all of said streams of clock pulses and their corresponding streams of periodic sync pulses, instead of one of said streams of clock pulses and its corresponding stream of periodic sync pulses;

said read buffer address generator further comprises at least one selector, coupled to said data sending high speed circuits and said sync pulse generation circuits, for receiving said streams of clock pulses and their corresponding periodic sync pulses, and selecting one of said streams of clock pulses and its corresponding stream of periodic sync pulses, said delay pipe and said read buffer address generator being coupled to said data sending high speed circuits through said at least one selector.

33. The apparatus as set forth in claim 25, wherein, said sync pulse generation circuits are disposed on said data sending high speed circuits, one sync pulse generation circuit per data sending high speed circuit; and said circular buffer chains, said write address generators and said read address generator, are disposed on said data receiving high speed circuit.

34. The apparatus as set forth in claim 25, wherein, said digital system is a data instrumentation system; said data sending high speed circuits are data sending high speed probes; and said data receiving high speed circuit is a data receiving high speed trace control circuit.

35. A data instrumentation system comprising:

a) a plurality of data sending high speed probes, each of said data sending high speed probes comprising means for generating a stream of data slices, a stream of clock pulses, and a stream of periodic sync pulses with a predetermined periodicity p;

b) a data receiving high speed trace control circuit comprising:

b.1) a plurality of circular buffer chains coupled to said data sending high speed probes for individually receiving and buffering one of said streams of data slices for at most a time period t, where t is a function of the maximum amount of skew between any two of said streams of data slices, said streams of data slices incurring varying amount of delays when they travel from said data sending high speed probes to said circular buffer chains, b.2) a plurality of write buffer address generators coupled to said data sending high speed probes and said plurality of circular buffer chains for receiving said streams of clock pulses and periodic sync pulses, and independently generating write buffer addresses for said circular buffer chains using said received clock pulses and periodic sync pulses, said streams of clock pulses and periodic sync pulses incurring similar varying amount of delays as they travel from said data sending high speed probes to said write buffer address generators, and b.3) read buffer address generators coupled to said data sending high speed probes and said circular buffer chains for receiving one of said streams of clock pulses and its corresponding periodic sync pulses, and generating synchronized read buffer addresses for said circular buffer chains using said received streams of clock pulses and periodic sync pulses.

* * * * *